United States Patent
Park

(10) Patent No.: US 9,937,769 B2
(45) Date of Patent: Apr. 10, 2018

(54) AIR CONDITIONING SYSTEM FOR VEHICLE

(71) Applicants: Hyundai Motor Company, Seoul (KR); Kia Motors Corporation, Seoul (KR)

(72) Inventor: June Kyu Park, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 235 days.

(21) Appl. No.: 14/929,278

(22) Filed: Oct. 31, 2015

(65) Prior Publication Data

US 2016/0355072 A1 Dec. 8, 2016

(30) Foreign Application Priority Data

Jun. 8, 2015 (KR) .......................... 10-2015-0080681

(51) Int. Cl.
*B60H 1/00* (2006.01)

(52) U.S. Cl.
CPC ..... *B60H 1/00057* (2013.01); *B60H 1/00385* (2013.01); *B60H 1/00899* (2013.01); *B60H 2001/00178* (2013.01)

(58) Field of Classification Search
CPC ............ B60H 1/00057; B60H 1/00064; B60H 3/0616
See application file for complete search history.

(56) References Cited

U.S. PATENT DOCUMENTS

2003/0157881 A1* 8/2003 Goupil, Jr. ........... B60H 3/0616
454/158
2012/0175081 A1* 7/2012 Katoh ................ B60H 1/00335
165/104.14

FOREIGN PATENT DOCUMENTS

| JP | 9-99734 A | 4/1997 |
| JP | 2010-23589 A | 2/2010 |
| JP | 2013141932 * 7/2013 ............... B60H 1/22 |
| KR | 2002-0038149 A | 5/2002 |
| KR | 2003-0035147 A | 5/2003 |
| KR | 10-2007-0064937 A | 6/2007 |
| KR | 10-2008-0089921 A | 10/2008 |
| KR | 10-2011-0011100 | 2/2011 |

OTHER PUBLICATIONS

English Translation of JP 2013141932 dated Jul. 2013.*

* cited by examiner

*Primary Examiner* — Cassey D Bauer
(74) *Attorney, Agent, or Firm* — Morgan, Lewis & Bockius LLP

(57) ABSTRACT

An air conditioning system for a vehicle may include a cooling module including a cooling duct, a cooling inlet formed at one side of the cooling duct, a cooling interior outlet and a cooling exterior outlet formed at an opposite side of the cooling duct, and an evaporator provided in an interior of the cooling duct, a heating module including a heating duct, a heating inlet formed at one side of the heating duct, a heating interior outlet and a heating exterior outlet formed at an opposite side of the heating duct, and a condenser provided in an interior of the heating duct, and a cooling blower and a heating blower provided in the respective interiors of the cooling duct and the heating duct.

9 Claims, 6 Drawing Sheets

AIR CONDITIONING SYSTEM FOR VEHICLE

CROSS-REFERENCE TO RELATED APPLICATION

The present application claims priority to Korean Patent Application No. 10-2015-0080681, filed Jun. 8, 2015, the entire contents of which is incorporated herein for all purposes by this reference.

BACKGROUND OF THE INVENTION

Field of the Invention

The present invention relates to a structure of an air conditioning apparatus for a vehicle, and more particularly to a configuration of an air conditioning system for performing air conditioning more efficiently in a specific driving environment.

Description of Related Art

An air conditioning system for cooling and heating the interior of a vehicle is installed in the vehicle. It is an important issue of the air conditioning system to always maintain the comfortable interior temperature of the vehicle.

In the air conditioning system for a vehicle, a cooling unit includes components such as a compressor for compressing a refrigerant, a condenser for condensing the refrigerant compressed by the compressor, an expansion value for converting the refrigerant condensed and liquefied by the condenser into a state of low temperature and low pressure, and an evaporator for cooling air using an evaporation latent heat of the refrigerant. In general, the cooling system lowers the temperature of air and adjusts the absolute humidity.

A heating unit includes a heater core for generating hot wind using heat generated when cooling water for cooling heat of an engine room retrieves heat of the engine to be heated, as a heat source, and a pump for supplying cooling water of the engine. In general, the heating system increases the temperature of air and adjusts the relative humidity.

A general existing air conditioning system supplies cooling air through a cooling unit and supplies hot air through the cooling water of the engine, but the structure of the air conditioning system can be changed according to an environment in which a vehicle travels. In particular, when the cooling water of the engine is not present, it is difficult and inefficient to configure the existing air conditioning system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air conditioning system that provides a new heat source for supplying hot air and is optimized accordingly.

According to various aspects of the present invention, an air conditioning system for a vehicle may include a cooling module including a cooling duct, a cooling inlet formed at one side of the cooling duct, a cooling interior outlet and a cooling exterior outlet formed at an opposite side of the cooling duct, and an evaporator provided in an interior of the cooling duct, a heating module including a heating duct, a heating inlet formed at one side of the heating duct, a heating interior outlet and a heating exterior outlet formed at an opposite side of the heating duct, and a condenser provided in an interior of the heating duct, and a cooling blower and a heating blower provided in the respective interiors of the cooling duct and the heating duct.

The condenser provided in the interior of the heating duct and an evaporator provided in the interior of the cooling duct may be connected to a refrigerant passage.

A compressor and an expansion value may be connected together to the refrigerant passage.

The air conditioning system may further include exhaust adjusting doors provided between the interior outlets and the exterior outlets of the respective cooling duct and the respective heating duct, for adjusting an amount of air discharged to an outside.

A discharge side of the cooling blower may be connected to a cooling inlet of the cooling duct, and an introduction side of the cooling blower may be connected to a circulation duct communicated with an interior of the vehicle.

An interior air discharge hole connected to the cooling blower may be formed in the circulation duct such that the interior air is discharged, and an opening/closing door may be provided in the interior air discharge hole such that introduction of the interior air or the exterior air into the cooling blower is adjusted.

The opening/closing door may include a rotary door provided with a rotary shaft, and an amount of interior air or exterior air introduced into the cooling blower may be adjusted according to rotation of the opening/closing door.

The air conditioning system may further include a filter housing connected to inlet sides of the cooling blower and the heating blower and provided with an opening at an upper end thereof such that a filter is attached to and detached from the filter housing in an upward/downward direction of a vehicle body.

The filter housing may be communicated in an air introduction direction of the cooling blower or the heating blower.

The cooling blower or the heating blower may be located in an engine room of the vehicle, and a hood extending in an introduction direction of air for preventing introduction of foreign substances may be provided at an upper portion of an introduction side of the cooling blower or the heating blower.

The air conditioning system for a vehicle of the present invention can show a high energy efficiency in an environment in which cooling water of an engine is not supplied.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
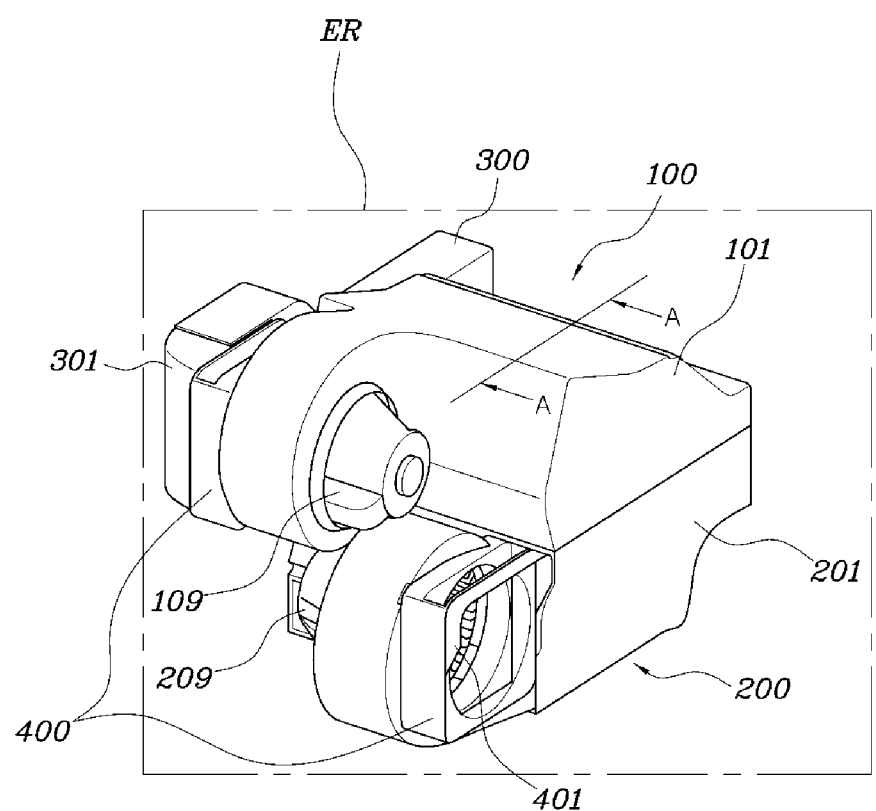
FIG. 1 is a perspective view of an exemplary air conditioning system for a vehicle according to the present invention.
Figure 2:
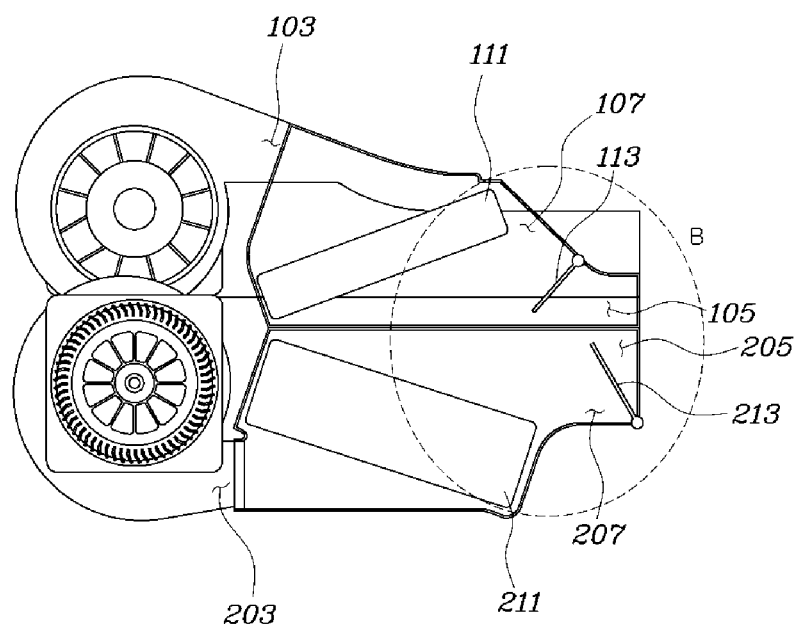
FIG. 2 is a sectional view taken along line A-A of FIG. 1.
Figure 3:
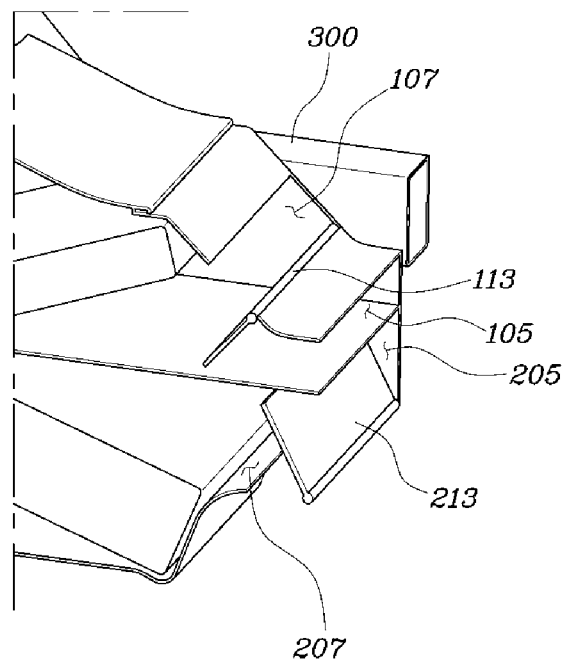
FIG. 3 is an enlarged view of Part B of the air conditioning system for a vehicle illustrated in FIG. 2.
Figure 4:
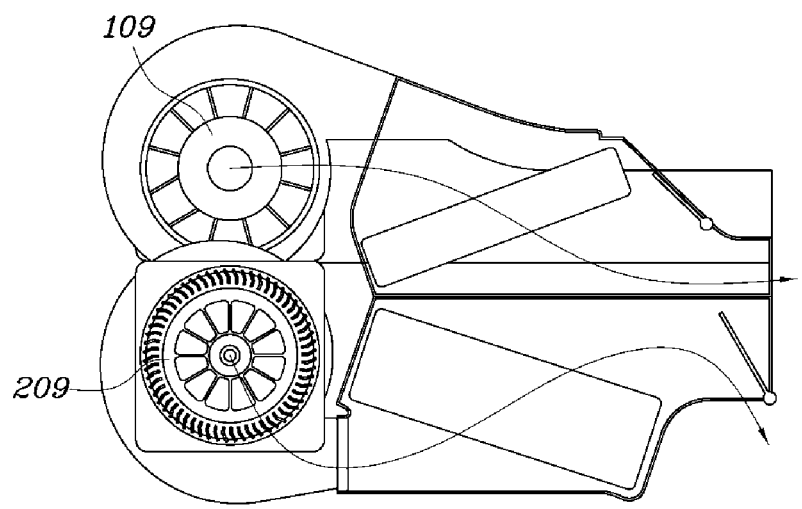
FIG. 4 is a view illustrating a maximum cooling state of the exemplary air conditioning system for a vehicle according to the present invention.
Figure 5:
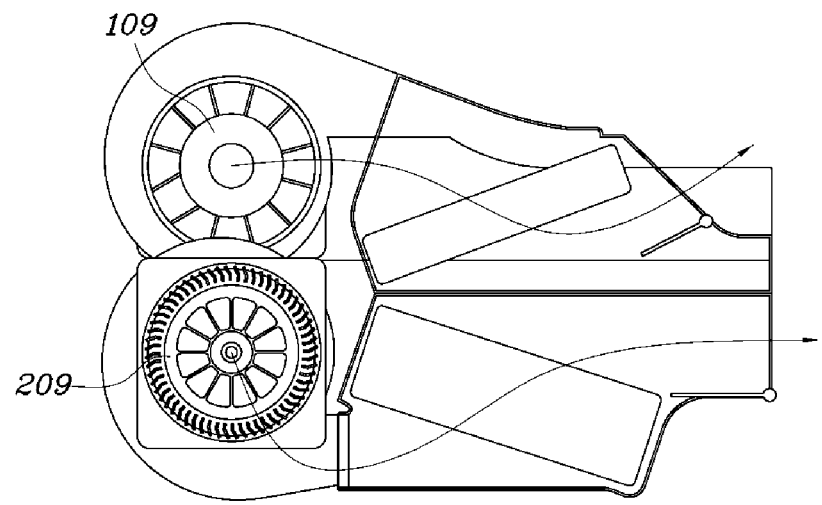
FIG. 5 is a view illustrating a maximum heating state of the exemplary air conditioning system for a vehicle according to the present invention.
Figure 6:
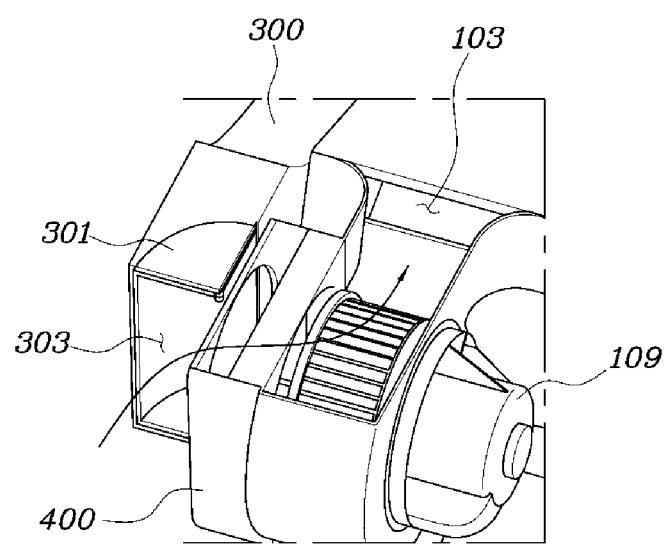
FIG. 6 is a view illustrating that exterior air is introduced into a cooling module of the exemplary air conditioning system for a vehicle according to the present invention.
Figure 7:
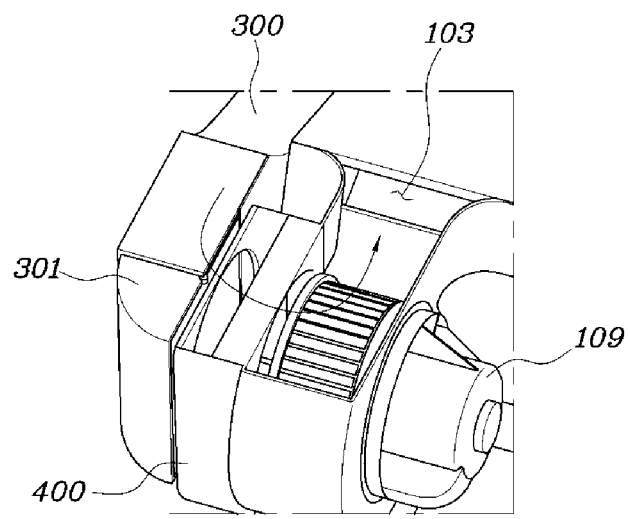
FIG. 7 is a view illustrating that interior air is introduced into a cooling module of the exemplary air conditioning system for a vehicle according to the present invention.
Figure 8:
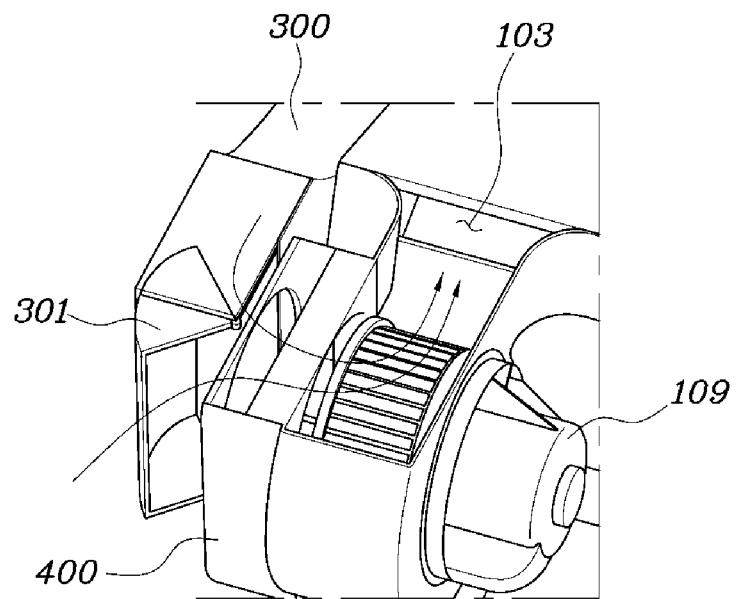
FIG. 8 is a view illustrating that interior air and exterior air are introduced into a cooling module of the exemplary air conditioning system for a vehicle according to the present invention.
Figure 9:
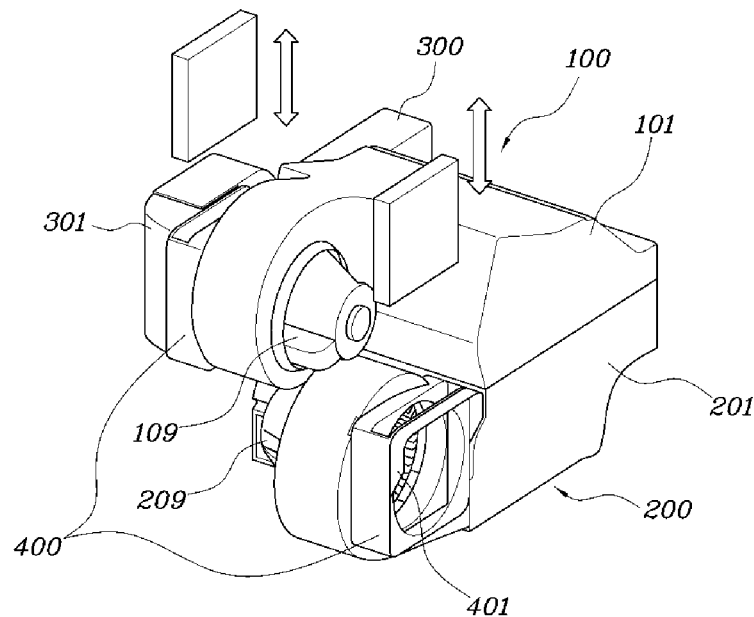
FIG. 9 is a view illustrating an exemplary air conditioning system for a vehicle according to the present invention.
Figure 10:
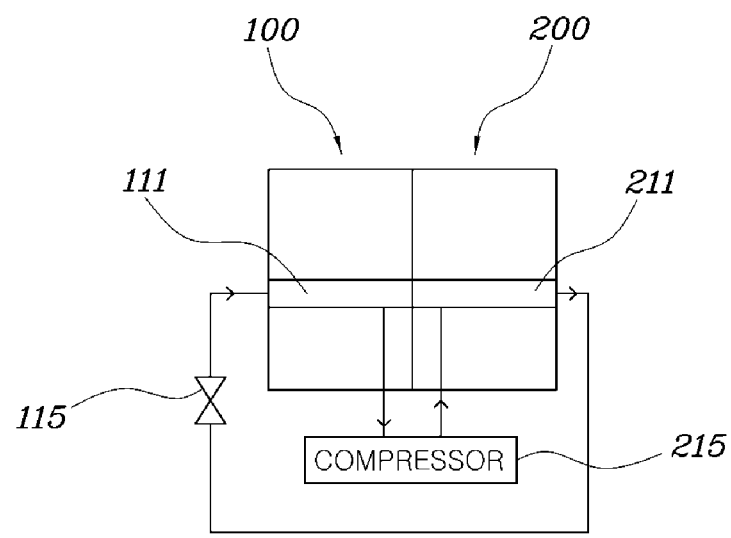
FIG. 10 is a schematic view of an exemplary air conditioning system for a vehicle according to the present invention.

FIG. 1 is a perspective view of an air conditioning system for a vehicle according to various embodiments of the present invention. FIG. 2 is a sectional view taken along line A-A of FIG. 1. FIG. 3 is an enlarged view of Part B of the air conditioning system for a vehicle illustrated in FIG. 2. FIG. 4 is a view illustrating a maximum cooling state of the air conditioning system for a vehicle according to various embodiments of the present invention. FIG. 5 is a view illustrating a maximum heating state of the air conditioning system for a vehicle according to various embodiments of the present invention. FIG. 6 is a view illustrating that exterior air is introduced into a cooling module 100 of the air conditioning system for a vehicle according to various embodiments of the present invention. FIG. 7 is a view illustrating that interior air is introduced into a cooling module 100 of the air conditioning system for a vehicle according to various embodiments of the present invention. FIG. 8 is a view illustrating that interior air and exterior air are introduced into a cooling module of the air conditioning system for a vehicle according to various embodiments of the present invention. FIG. 9 is a view illustrating an air conditioning system for a vehicle according to various embodiments of the present invention. FIG. 10 is a schematic view of an air conditioning system for a vehicle according to various embodiments of the present invention.

Referring to FIG. 1, the air conditioning system according to the present invention includes a cooling module 100 including a cooling duct 101, a cooling inlet 103 formed at one side of the cooling duct 101, a cooling interior outlet 105 and a cooling exterior outlet 107 formed at an opposite side of the cooling duct 101, and an evaporator 111 provided in the interior of the cooling duct 101, a heating module 200 including a heating duct 201, a heating inlet 203 formed at one side of the heating duct 201, a heating interior outlet 205 and a heating exterior outlet 207 formed at an opposite side of the heating duct 201, and a condenser 211 provided in the interior of the heating duct 201, and a cooling blower 109 and a heating blower 209 provided in the interiors of the cooling duct 101 or the heating duct 201, respectively.

Referring to FIGS. 1 and 2, the cooling module 100 includes the cooling duct 101, the cooling inlet 103 is formed at one side of the cooling duct 101, the cooling interior outlet 105 and the cooling exterior outlet 107 are formed at an opposite side of the cooling duct, and the evaporator 111 is provided in the interior of the cooling duct 101. The heating module 200 includes the heating duct 201, the heating inlet 203 is formed at one side of the heating duct 201, the heating interior outlet 205 and the heating exterior outlet 207 are formed at an opposite side of the heating duct 201, and the condenser 211 is provided in the interior of the heating duct 201. The cooling blower 109 and the heating blower 209 are provided in the interiors of the cooling duct 101 or the heating duct 201, respectively.

In the air conditioning system according to the present invention, the cooling duct 101 and the heating duct 201 have separate independent spaces, so that the efficiency of the air conditioning system can be improved by reducing an interference between the air conditioning air and preventing cooled air from being reheated or the heated air from being cooled. In addition, the cooling duct 101 and the heating duct 201 are provided with the cooling blower 109 and the heating blower 209, respectively, so that the amount of air supplied into the interiors of the cooling duct 101 and the heating duct 201 can be sufficiently secured. Furthermore, the outlets for the cooling duct 101 and the heating duct 201 are separately provided as an interior outlet and an exterior outlet, so that the air conditioned air not only can be supplied into the interior but also can be discharged to the outside according to occasions.

The condenser 211 provided in the interior of the heating duct 201 and the evaporator 111 provided in the interior of the cooling duct 101 may be connected to a single refrigerant passage. A compressor 215 and an expansion value 115 may be connected together to the refrigerant passage.

Referring to FIG. 10, in the present invention, all of the expansion value 115, the evaporator 111, the compressor 215, and the condenser 211 are disposed on a single cooling line, so that the refrigerant of high temperature and high pressure having passed through the compressor 215 may be used as a heat source. That is, cooling and heating may be performed at the same time by using only the cooling system of an existing air conditioning system for a vehicle. Accordingly, when a heating source such as engine cooling water cannot be secured, the cooling system may be usefully utilized. The air conditioning system for a vehicle according to the present invention may be simplified because a separate heating line for heating and a water pump are not necessary, and may have an improved efficiency because a cooling area of the refrigerant is expanded.

The air conditioning system for a vehicle according to the present invention starts an air conditioning operation and the evaporator 111 and the condenser 211 may be always operated at the same time. In this case, because a component such as a 3-way valve for selectively supplying a refrigerant to the evaporator 111 and the condenser 211 is not necessary, the structure of the air conditioning system may be simplified. That is, a heating source may be secured and cooling efficiency may be improved at the same time.

Exhaust adjusting doors 113 and 213 for adjusting an amount of air discharged to the outside may be provided between the interior outlets and the exterior outlets of the cooling duct 101 and the heating duct 201, respectively.

Referring to FIGS. 2 to 5, according to the present invention, the air conditioned air may be supplied into the interior or exhausted to the outside through the exhaust adjusting doors 113 and 213. The interior can be precisely air-conditioned by adjusting the exhaust adjusting doors 113 and 213 to adjust the mixture ratio of the air air-conditioned by the cooling module 100 or the heating module 200. As illustrated in FIG. 4, in a maximum cooling mode, the exhaust adjusting door 113 on the cooling duct 101 blocks the cooling exterior outlet 107 to supply the cooled air into the interior, and the exhaust adjusting door 213 on the heating duct 201 blocks the heating interior outlet 205 to exhaust the heated air to the outside. As illustrated in FIG. 5, in a maximum heating mode, the exhaust adjusting door 213 on the heating duct 201 blocks the heating exterior outlet 207 to supply the heated air into the interior, and the exhaust adjusting door 113 on the cooling duct 101 blocks the cooling interior outlet 105 to exhaust the heated air to the outside.

A discharge side of the cooling blower 109 may be connected to the cooling inlet 103 of the cooling duct 101, and may be connected to a circulation duct 300, an introduction side of which is communicated with the interior. The circulation duct 300 has an interior air discharge hole 303 connected to the cooling blower 109 such that the interior air may be discharged, and an opening/closing door 301 is provided in the interior air discharge hole 303 such that introduction of the interior air or the exterior air into the cooling blower 109 may be adjusted. The opening/closing door 301 is a rotary door provided with a rotary shaft, and the amount of interior air or exterior air introduced into the cooling blower 109 may be adjusted according to rotation of the opening/closing door 301.

The circulation duct 300 suctions the interior air to supply the suctioned interior air into the cooling blower 109. The opening/closing door 301 is provided in the interior air discharge hole 303 to adjust the interior air or the exterior air supplied to the cooling blower 109.

Referring to FIGS. 6 to 8, the cooling blower 109 may introduce the exterior air and supply the air cooled by the cooling module 100 into the interior, and may receive the interior air through the circulation duct 300, cool the supplied air through the cooling module 100, and then supply the cooled air into the interior again. As illustrated in FIG. 6, when the opening/closing door 301 is provided, introduction of the interior air into the cooling blower 109 is interrupted and only the exterior air is supplied into the cooling blower 109. As illustrated in FIG. 7, when the opening/closing door 301 is provided, introduction of the exterior air into the cooling blower 109 is interrupted and only the interior air is supplied into the cooling blower 109. As illustrated in FIG. 8, when the opening/closing door 301 is provided, both the interior air and the exterior air are supplied to the cooling blower 109. When the cooling module is operated, the cooled exterior air may be supplied to convex with the existing interior air to perform an air conditioning operation, however if the interior air itself is supplied to the cooling blower 109 through the circulation duct 300 again to cool the interior air through the heating module 100, an air conditioning operation may be rapidly performed.

A filter housing 400 may be connected to introduction sides of the cooling blower 109 and the heating blower 209 and may have an opening at an upper end thereof such that a filter may be attached to and detached from the filter housing in the upward/downward direction of the vehicle body. The filter housing 400 may be communicated in the air introduction directions of the cooling blower 109 or the heating blower 209.

Referring to FIG. 9, an opening for mounting a filter is provided at an upper end of the filter housing 400 such that the filter is attached and detached in the upward/downward direction of the vehicle body, so that the components may not be separately disassembled when the filter is exchanged and the vehicle can be easily repaired. The filter housing 400 is communicated in the air introduction direction of the cooling blower 109 or the heating blower 209, so that an area covered by the filter may be minimized and the performance of the filter may not be lowered while suctioning of the air of the blower is not hampered.

The cooling blower 109 or the heating blower 209 is located in the engine room ER of the vehicle, and a hood 401 extending in the introduction direction of air for preventing introduction of foreign substances may be provided at an upper end of the introduction side of the cooling blower 109 or the heating blower 209.

Referring to FIG. 9, when the cooling blower 109 or the heating blower 209 is disposed in the engine room ER of the vehicle to facilitate repair of the vehicle, foreign substance may be introduced into the cooling blower 109 or the heating blower 209, causing a malfunction or a breakdown in a weather change situation such as rain or heavy snow, or in a special situation such as washing of the vehicle. An apparatus for preventing a malfunction or breakdown is necessary, but suctioning of the air should not be obstructed so that a hood 401 is installed at an upper portion of the cooling blower 109 or the heating blower 209 to prevent introduction of foreign substances.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioning system for a vehicle, comprising:
   a cooling module including a cooling duct, a cooling inlet formed at one side of the cooling duct, a cooling interior outlet and a cooling exterior outlet formed at an opposite side of the cooling duct, and an evaporator provided in an interior of the cooling duct;
   a heating module including a heating duct, a heating inlet formed at one side of the heating duct, a heating interior outlet and a heating exterior outlet formed at an opposite side of the heating duct, and a condenser provided in an interior of the heating duct;
   a cooling blower and a heating blower provided in the respective interiors of the cooling duct and the heating duct; and
   a filter housing connected to inlet sides of the cooling blower and the heating blower and provided with an opening at an upper end thereof such that a filter is attached to and detached from the filter housing in an upward/downward direction of a vehicle body,
   wherein the filter housing connected to the inlet side of the cooling blower is disposed between the cooling blower and a circulation duct, and the filter attached in the filter housing connected to the inlet side of the cooling blower is provided to filter an interior air discharged from the circulation duct and an exterior air.

2. The air conditioning system of claim 1, wherein the condenser provided in the interior of the heating duct and an evaporator provided in the interior of the cooling duct are connected to a refrigerant passage.

3. The air conditioning system of claim 2, wherein a compressor and an expansion value are connected together to the refrigerant passage.

4. The air conditioning system of claim 1, further comprising exhaust adjusting doors provided between the interior outlets and the exterior outlets of the respective cooling duct and the respective heating duct, for adjusting an amount of air discharged to an outside.

5. The air conditioning system of claim 1, wherein a discharge side of the cooling blower is connected to the cooling inlet of the cooling duct, and an introduction side of the cooling blower is connected to the circulation duct communicated with an interior of the vehicle.

6. The air conditioning system of claim 5, wherein an interior air discharge hole connected to the cooling blower is formed in the circulation duct such that the interior air is discharged, and an opening/closing door is provided in the interior air discharge hole such that introduction of the interior air or the exterior air into the cooling blower is adjusted.

7. The air conditioning system of claim 6, wherein the opening/closing door comprises a rotary door provided with a rotary shaft, and an amount of the interior air or the exterior air introduced into the cooling blower is adjusted according to rotation of the opening/closing door.

8. The air conditioning system of claim 1, wherein the filter housing is communicated in an air introduction direction of the cooling blower or the heating blower.

9. The air conditioning system of claim 1, wherein the cooling blower or the heating blower is located in an engine room of the vehicle, and a hood extending in an introduction direction of air for preventing introduction of foreign substances is provided at an upper portion of an introduction side of the cooling blower or the heating blower.

* * * * *